United States Patent
Banerjee et al.

(10) Patent No.: US 10,176,126 B1
(45) Date of Patent: Jan. 8, 2019

(54) METHODS, SYSTEMS, AND COMPUTER PROGRAM PRODUCT FOR A PCI IMPLEMENTATION HANDLING MULTIPLE PACKETS

(71) Applicant: Cadence Design Systems, Inc., San Jose, CA (US)

(72) Inventors: Bikram Banerjee, Bangalore (IN); Anish Mathew, Ernakulam (IN)

(73) Assignee: Cadence Design Systems, Inc., San Jose, CA (US)

( * ) Notice: Subject to any disclaimer, the term of this patent is extended or adjusted under 35 U.S.C. 154(b) by 628 days.

(21) Appl. No.: 14/754,508

(22) Filed: Jun. 29, 2015

(51) Int. Cl.
*G06F 13/00* (2006.01)
*G06F 13/16* (2006.01)
*G06F 13/42* (2006.01)

(52) U.S. Cl.
CPC ...... *G06F 13/1673* (2013.01); *G06F 13/4221* (2013.01); *G06F 2213/0024* (2013.01); *G06F 2213/0026* (2013.01)

(58) Field of Classification Search
None
See application file for complete search history.

(56) References Cited

U.S. PATENT DOCUMENTS

| | | | | |
|---|---|---|---|---|
| 5,396,485 A | * | 3/1995 | Ohno | H04L 12/1877 370/217 |
| 6,691,200 B1 | * | 2/2004 | Zhou | G06F 13/4059 710/310 |
| 6,725,297 B1 | * | 4/2004 | Askar | G06F 13/128 710/11 |
| 6,757,755 B2 | * | 6/2004 | Askar | G06F 13/128 709/236 |
| 6,950,438 B1 | * | 9/2005 | Owen | H04L 69/12 370/409 |

(Continued)

FOREIGN PATENT DOCUMENTS

| CN | 102006241 A | * | 4/2011 | |
| GB | 2442129 A | * | 3/2008 | ............. H04L 12/40 |

OTHER PUBLICATIONS

'PCI Express System Architecture' by Ravi Budruk et al., copyright 2004 by MindShare, Inc. (Year: 2004).*

(Continued)

*Primary Examiner* — Steven G Snyder
(74) *Attorney, Agent, or Firm* — Vista IP Law Group, LLC

(57) ABSTRACT

Disclosed are peripheral component interconnect (PCI) implementations and methods for implementing PCI implementations handling posted transaction layer packets (TLPs) and completion TLPs. PCI implementations include one or more receive buffers storing completion TLPs and posted TLPs, a set of write and read pointers for the receive buffers, a token manager to associate ordering tokens with posted TLPs, and a pointer-based ordering mechanism to determine an order for handling posted and completion TLPs. PCI implementations may further include an identification-based ordering mechanism to revise the order. The methods identify a completion TLP and multiple posted TLPs, associate a posted TLP with an ordering token, and determine the order for handling the completion and posted TLPs with at least the pointer-based ordering mechanism. The methods may further optionally revise the order with at least the identification-based ordering mechanism.

18 Claims, 12 Drawing Sheets

(56) References Cited

U.S. PATENT DOCUMENTS

| | | | | |
|---|---|---|---|---|
| 7,221,678 | B1* | 5/2007 | Hughes | H04L 47/6285 |
| | | | | 370/401 |
| 7,274,692 | B1* | 9/2007 | Hughes | H04L 47/10 |
| | | | | 370/389 |
| 7,496,698 | B2* | 2/2009 | Biran | G06F 13/1657 |
| | | | | 709/228 |
| 7,941,587 | B2 | 5/2011 | Brahmadathan et al. | |
| 8,019,910 | B2* | 9/2011 | Brownell | G06F 13/4221 |
| | | | | 370/230 |
| 8,284,790 | B1* | 10/2012 | Kommidi | H04L 47/33 |
| | | | | 370/416 |
| 8,880,980 | B1 | 11/2014 | Mathew et al. | |
| 8,904,082 | B1 | 12/2014 | Brahmadathan et al. | |
| 9,143,346 | B1* | 9/2015 | Akhter | H04L 12/6418 |
| 9,736,071 | B2* | 8/2017 | Ajanovic | G06F 13/124 |
| 9,749,448 | B2* | 8/2017 | Guddeti | H04L 69/22 |
| 2002/0103948 | A1* | 8/2002 | Owen | G06F 13/4243 |
| | | | | 710/33 |
| 2005/0041655 | A1* | 2/2005 | Hughes | H04L 45/10 |
| | | | | 370/389 |
| 2006/0173986 | A1* | 8/2006 | Ikeda | H04L 47/10 |
| | | | | 709/223 |
| 2006/0218316 | A1* | 9/2006 | Biran | G06F 13/1657 |
| | | | | 710/54 |
| 2008/0172499 | A1* | 7/2008 | Moriki | G06F 13/28 |
| | | | | 710/22 |
| 2009/0037616 | A1* | 2/2009 | Brownell | G06F 13/4221 |
| | | | | 710/29 |
| 2010/0303079 | A1* | 12/2010 | Singhal | G06F 13/385 |
| | | | | 370/394 |
| 2012/0221764 | A1* | 8/2012 | Glass | G06F 3/0659 |
| | | | | 710/314 |
| 2013/0268712 | A1* | 10/2013 | Ajanovic | G06F 13/124 |
| | | | | 710/310 |
| 2015/0178241 | A1* | 6/2015 | Ajanovic | G06F 13/124 |
| | | | | 710/29 |
| 2016/0147592 | A1* | 5/2016 | Guddeti | H04L 1/0056 |
| | | | | 714/776 |
| 2016/0283428 | A1* | 9/2016 | Guddeti | G06F 13/4027 |
| 2016/0328276 | A1* | 11/2016 | Tanimoto | G06F 9/526 |
| 2017/0052924 | A1* | 2/2017 | Glaser | G06F 13/4282 |
| 2017/0212579 | A1* | 7/2017 | Tirumala | G06F 1/3287 |
| 2017/0344419 | A1* | 11/2017 | Watkins | G06F 11/076 |

OTHER PUBLICATIONS

'PCI Express Base Specification' Revision 1.0a, Apr. 15, 2003. (Year: 2003).*

Lawley, Jason. "Understanding Performance of PCI Express Systems." Oct. 2014.

Budruk, Ravi, Don Anderson, and Tom Shanley. PCI express system architecture. Addison-Wesley Professional, 2004.

"Down to the TLP: How PCI express devices talk (Part I)", Xillybus, URL: http://xillybus.com/tutorials/pci-express-tlp-pcie-primer-tutorial-guide-1, 2010, Accessed on: Aug. 10, 2017.

"Down to the TLP: How PCI express devices talk (Part II)", Xillybus, URL: http://xillybus.com/tutorials/pci-express-tlp-pcie-primer-tutorial-guide-2, 2010, Accessed on: Aug. 10, 2017.

* cited by examiner

METHODS, SYSTEMS, AND COMPUTER PROGRAM PRODUCT FOR A PCI IMPLEMENTATION HANDLING MULTIPLE PACKETS

BACKGROUND

On the receiving (RX) side of a Peripheral Component Interconnect (PCI such as PCI Express PCI Express or PCIe) serial bus expansion bus controller, there are posted transaction layer packet (TLP) buffer and completion TLP buffer in a store and forward architecture. The receive buffers (RX buffers such as the receive buffers in a transaction layer of a PCIe endpoint) facilitate error filtering and flow control of TLPs. Identification (ID) based ordering is a feature in PCIe where a completion TLP may pass a posted TLP if the posted TLP's requester ID is different from the completion TLP's completer ID, even if the posted and completion TLPs are associated with the same Virtual Channel (VC). This ordering requirement between completion TLP and posted TLPs requires tracking the order of reception of the posted TLPs and the completion TLPs from the PCIe link as well as the respective identifications (IDs) and virtual channel (VC) IDs of the posted and completion TLPs.

These requirements are further complicated by the fact that in a datapath architecture (e.g., a 256-bit datapath), there may be two or more TLPs coming in to a PCIe endpoint (e.g., to the receive buffers of a PCIe endpoint) during a single clock cycle or during multiple clock cycles. These two or more TLPs may be of any types and thus pose a challenge in maintaining the order of incoming posted TLPs and the completion TLPs in response to non-posted TLPs.

Therefore, there is a need for methods, systems, and computer program product for PCI implementation handing one or more packets in a single cycle or multiple clock cycles.

SUMMARY

Disclosed are method(s), system(s), and article(s) of manufacture for PCI implementation handling multiple packets in various embodiments. Some embodiments are directed to a method for implementing a PCI architecture handling multiple packets. In some first embodiments, handling packets may include transmitting or forwarding packets (e.g., transaction layer packets) from one or more sources to one or more destinations in a determined order or de-queuing packets in a determined order. The method may identify a completion transaction layer packet (TLP) and a plurality of posted transaction layer packets (TLPs) in one or more buffers of the PCI implementation, associate a first posted TLP in the plurality of posted TLPs with a first ordering token, and determine, with a pointer-based ordering mechanism in the PCI implementation, an order for handling the first posted TLP and the completion TLP from the one or more buffers by comparing a first pointer in the first ordering token with a second pointer for the completion TLP.

In some of the first embodiments, the order for handling the first posted TLP and the completion TLP from the one or more buffers may be determined with an identification-based ordering mechanism at least by comparing one or more token attributes of the first ordering token with one or more attributes of the completion TLP. In addition or in the alternative, the one or more token attributes of the first ordering token comprise a requester identification and a first virtual channel identification of the first posted TLP. Determining the order with the identification-based ordering mechanism may be performed based in part or in whole upon a pointer match criterion in some of the first embodiments.

In some of these immediately preceding embodiments, the first pointer may comprise a write pointer of a completion buffer for the first posted TLP, and the second pointer may comprise a read pointer of the completion buffer for the completion TLP. In some embodiments, the pointer match criterion comprises whether the read pointer of the completion buffer for the completion TLP matches the write pointer of the completion buffer for the first posted TLP. In addition or in the alternative, the one or more buffers include the completion buffers that store the completion TLP, and the order for handling the first posted TLP and the completion TLP is determined with the pointer-based ordering mechanism using existing attributes, without introducing additional attributes to the PCI implementation.

In some of the first embodiments, the plurality of posted TLPs include at least two posted TLPs that arrive at a receive buffer of the one or more buffers in one clock cycle. In determining the order for handling the first posted TLP and the completion TLP, a write pointer for a receive buffer stored in the first ordering token may be compared to a read pointer for the receive buffer associated with the completion TLP by using at least the pointer-based ordering mechanism in some embodiments. The completion TLP may be de-queued by forwarding the completion TLP to an application layer in some embodiments, wherein the write pointer stored in the first ordering token is determined to be different from the read pointer associated with the completion TLP. In addition or in the alternative, a requester identification stored in the first ordering token for the first posted TLP may be compared to a completer identification associated with the completion TLP to generate an identification matching result, and a first virtual channel identification stored in the first ordering token for the first posted TLP may be compared to a completion virtual channel identification associated with the completion TLP to generate a virtual channel matching result.

In some of these immediately preceding embodiments, the completion TLP may be de-queued by forwarding the completion TLP to an application layer, wherein the write pointer stored in the first ordering token is determined to be identical to the read pointer associated with the completion TLP, and at least one of the virtual channel matching result and the identification matching result is determined to be negative, and the write pointer stored in the first ordering token may be updated or replaced with a next read pointer of the receive buffer, wherein the write pointer stored in the first ordering token is determined to be different from the read pointer associated with the completion TLP.

When both the identification matching result and the virtual channel matching result are determined to be affirmative, the completion TLP may be ordered with respect to at least the first posted TLP and may be held in the receive buffer, regardless of a relative order in which the completion TLP and the first posted TLP are received in the receive buffer. In some of these embodiments, the completion TLP in the receive buffer may be de-queued after de-queuing one or more posted TLPs including the first posted TLP and having one or more requester identifications matching the completer identification and one or more virtual channel identifications matching the completion virtual channel identification.

In addition to the first posted TLP, one or more additional posted TLP in the plurality of posted TLPs with one or more corresponding ordering tokens, and the order for handling the first posted TLP, the one or more additional posted TLPs, and the completion TLP may be determined with the pointer-based ordering mechanism in the PCI implementation by comparing one or more pointers in the one or more corresponding ordering tokens with the second pointer for the completion TLP.

In some embodiments, the order for handling the first posted TLP, the one or more posted TLPs, and the completion TLP from the one or more buffers may be revised with the identification-based ordering mechanism in the PCI implementation by further comparing the one or more token attributes of the one or more corresponding ordering tokens with the one or more attributes of the completion TLP, wherein at least two posted TLPs arrive at a receive buffer storing therein the completion TLP in a same clock cycle. In addition, the completion TLP, the first posted TLP, and the one or more additional posted TLPs may be de-queued according to the order that has been revised.

Some embodiments are directed at a hardware apparatus or mechanism that may be invoked to perform any of the methods, processes, or sub-processes disclosed herein. The hardware apparatus or mechanism may include one or more variants of a PCI implementation that includes one or more receive buffers for storing a completion transaction layer packet (TLP) and one or more posted transaction layer packets (TLPs), a set of write pointers and a set of read pointers for the one or more receive buffers, a token management mechanism to associate one or more attributes of a posted TLP with an ordering token, wherein the token management mechanism associates one or more ordering tokens for the one or more posted TLPs, and a pointer-based ordering mechanism to generate a pointer matching result including an order for handling the completion TLP and the one or more posted TLPs at least by comparing a read pointer for the completion TLP to one or more write pointers stored in the one or more ordering tokens.

In some embodiments, the PCI implementation may further include an identification-based ordering mechanism in the PCI implementation to revise the order for handling the one or more posted TLPs and the completion TLP by further comparing one or more token attributes stored in the one or more ordering tokens with one or more attributes of the completion TLP, wherein the identification-based ordering mechanism is invoked when the read pointer for the completion TLP is determined to match at least one write pointer stored in at least one ordering token for at least one posted TLP.

In addition or in the alternative, the identification-based ordering mechanism of the PCI implementation may also include a first identification comparator to compare a requester identification stored in the at least one ordering token for the at least one posted TLP to a completer identification associated with the completion TLP and generate an identification matching result and a second identification comparator to compare a first virtual channel identification stored in the at least one ordering token for the at least one posted TLP to a completion virtual channel identification associated with the completion TLP and generate a virtual channel matching result. In addition or in the alternative, the identification-based ordering mechanism of the PCI implementation may further include a processing order determination mechanism to determine the order in which the completion TLP and the one or more posted TLPs are processed based in part upon the pointer matching result, the identification matching result, and the virtual channel matching result.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some illustrative forms of the non-transitory machine-readable storage media may also be found in the System Architecture Overview section below.

More details of various aspects of the methods, systems, or articles of manufacture for PCI implementation handling multiple packets in a single cycle or multiple clock cycles are described below with reference to FIGS. 1-4.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1A:
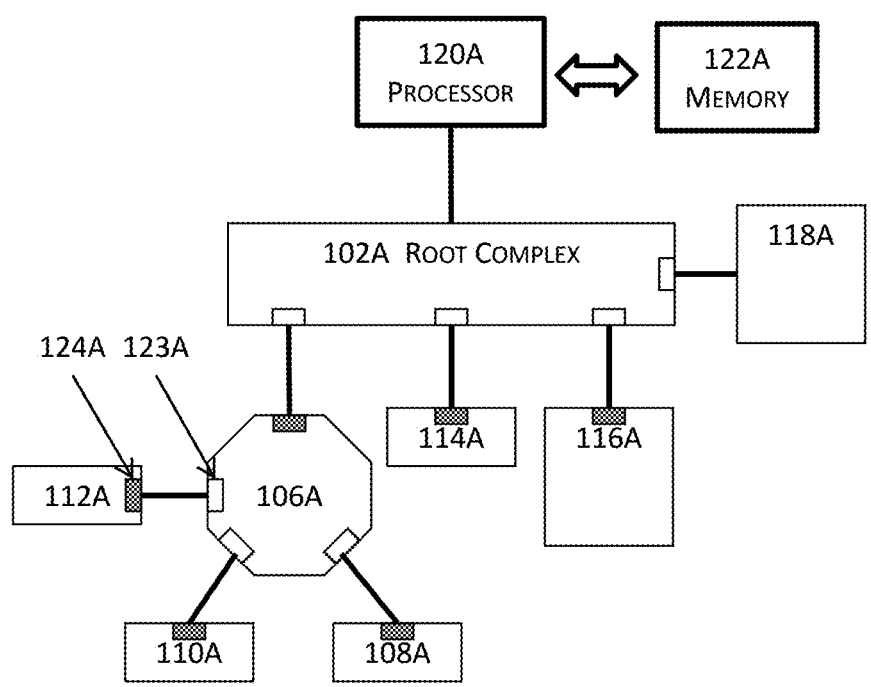
FIG. 1A illustrates a high level schematic block diagrams for a portion of a computing system including a PCI implementation handling multiple packets in a single cycle or multiple clock cycles in one or more embodiments.

Various embodiments of the invention are directed to a methods, systems, and articles of manufacture for a PCI implementation on which a method for implementing a PCI implementation handling multiple packets in a single clock cycle or multiple clock cycles where one or more packets are received for each clock cycle of these multiple clock cycles. In some embodiments, the PCI implementation is devised to handle multiple packets arriving at a queue of the PCI implementation in multiple clock cycles, where one or more packets arrive at the queue during each clock cycle of these multiple clock cycles. In these embodiments, the PCI implementation is devised to handle packets that arrive at a queue at a rate of a single packet per clock cycle, multiple packets per clock cycle, or any combinations thereof. Other objects, features, and advantages of the invention are described in the detailed description, figures, and claims.

Some embodiments are directed at a method for implementing and identification- and pointer-based ordering for re-purposing receiving (RX) buffers in the 256-bit, multiple-TLP PCI implementation in an efficiently utilized silicon area, with high performance and no extra latency for ID based ordering. The method is based on using the completion buffer pointers for temporal sequencing and ordering tokens. The completion buffer may include, for example, the receive buffers of a transaction layer of a PCI device in some embodiments or any other buffers that hold various packets (e.g., posted TLPs, non-posted TLPs, completion TLPs, etc.) in a PCI controller or device. The completion buffer may be re-purposed to perform TLP ordering in addition to error filtering and flow control in some embodiments.

In some embodiments, an ordering token may be associated with a posted TLP in flight, records the requester identification (ID), the virtual channel (VC) identification of the posted TLP, and the completion receive buffer (e.g., an FIFO or first in, first out buffer) write pointer at the time of allocation. In some embodiments, there may be two or more tokens allocated in the same cycle as various embodiments may handle two or more posted TLPs arriving during the same clock cycle.

A token may be de-allocated when the posted TLP is forwarded or de-queued to application layer or software layer which provides the initialization, numeration, and/or run-time for the PCIe architecture. A completer ID includes the identification of a completion TLP and identifies the sender of the completion TLP. A requester ID may constitute a part of a TLP (e.g., a completion TLP, a posted TLP, a non-posted TLP, etc.) and identify the receiver of the TLP. For example, a requester ID in a completion TLP identifies the receiver (e.g., the root complex, a PCIe switch network, etc.) of the completion TLP.

The completer ID and VC identification of the completion TLP at the head of the completion buffer and the completion buffer read pointer may be compared to their corresponding values in every token in some embodiments. In these embodiments, if all fields match then the completion TLP is determined to arrive after, for example, a corresponding posted TLP(s) and hence needs to be ordered or reordered. The PCI implementation may thus hold the completion TLP in the completion buffer and wait for the posted TLP corresponding to the matched ordering token to be de-queued. In some other embodiments where not all fields match, the completion may be forwarded to application layer from the RX buffer. The write pointer information in the ordering token may be updated with the read address of the next completion TLP's read pointer in the completion buffer to ensure that the temporal sequences is maintained for the completion TLPs.

The identification- and pointer-based ordering or data flow control may be implemented in a complex multi-TLPs per clock cycle architecture. The same implementation may also handle relaxed ordering as well as strict ordering as defined in PCIe spec. The implementation may also provide the advantages of being silicon area-efficient and exhibiting high performance and low latency. In some embodiments, these techniques described herein may be based in part or in whole upon ordering of tokens. A token may be allocated when a posted TLP enters the posted buffer (e.g., the transmit buffer in a transaction layer) and comprises information including at least one of a requester ID of the TLP, the VC identification of the TLP, and the current write pointer of the completion buffer. In some of these embodiments, a buffer described herein may be implemented as a first in, first out (FIFO) buffer.

In some embodiments, the current write pointer of the completion buffer may be used to maintain or track the sequence of reception of TLPs from the PCIe link. In these embodiments, for every posted TLP queued, the completion buffer write pointer may be recorded in an ordering token. The ordering token may be released when the posted TLP is forwarded to and accepted by the application layer. For example, in a 256-bit datapath architecture, there may be two posted TLPs being queued in the same clock cycle. The token management mechanism manages allocation of two tokens in these embodiments. In this example, in addition to receiving two (or more) completion TLPs, the receive buffer may also receive or include a completion TLP at the head of the buffer.

In this example, before the completion TLP at the head of the completion buffer may be de-queued, one or more pieces of the following information may passed to the allocated tokens: the completer ID of the completion TLP, the VC identification of the completion TLP, the read pointer of the current TLP in the completion buffer, and the read pointer of the next completion TLP in the RX completion buffer in some embodiments.

The completion TLP read pointer may be matched with the completion buffer write pointer stored in one or more ordering tokens. In some embodiments where one or more of these ordering tokens including the write pointer that matches the completion TLP read pointer, the completion TLP is received after the one or more posted TLPs corresponding to the one or more ordering tokens and hence needs to be ordered.

In some of these embodiments where there is a "pointer match", the requester ID and the VC ID are also respectively matched with the completer ID and the completer VC ID. If all of the identifications and VC identifications match, the completion TLP needs to be ordered or reordered and may not be de-queued until the posted TLP(s) corresponding to the ordering token(s) having matched requester ID(s) and VC ID(s) is (are) de-queued. In these embodiments, the data flow control is implemented with both the ID match mechanism and the pointer match mechanism. The techniques described herein use one or more buffers (e.g., the completion buffer and/or the posted buffer, etc.) not only for flow control purposes and error filtering but also for TLP ordering.

More than one ordering token may hit a "pointer match" in some embodiments, and if any ordering token having the requester ID and VC ID that respectively match the completer ID and the completer VC number, the completion TLP needs to be ordered or reordered in some embodiments. In some embodiments where there is a "pointer match", but the requester ID or the VC ID does not match, then no ordering may be required as per ID based ordering. In these embodiments, the completion TLP may be forwarded to the application or software layer, and the completion write pointer in the token may be replaced with the read pointer of the next completion TLP in the completion buffer. In some embodiments where the read pointer of the completion TLP at the head of the completion buffer does not match any completion write pointer in the ordering tokens, the completion TLP may be forwarded to the application or software layer.

These techniques described herein do not require additional receive buffers for the purpose of TLP ordering. These techniques may interact with the completion buffer read and write pointers to maintain temporal sequence between posted and completion TLPs. In some embodiments, the silicon area of a PCI implementation described herein may be improved or optimized by using the techniques described here. These techniques also handle the complication of two or more TLPs (e.g., two or more posted TLPs, completion TLPs, or combinations thereof) that may be queued in a single clock cycle or multiple clock cycles where one or more TLPs may be queued in each clock cycle of these multiple clock cycles.

Another advantage of at least some techniques described herein is that there is no additional latency incurred with the techniques described herein. Identification-based and pointer-based ordering as described herein may be implemented at or close to line rate with no or minimal penalty in performance, and thus the identifications may be compared across all posted TLPs in flight or even in a parallel or distributed computing environment.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

FIG. 1A illustrates a high level schematic block diagrams for a portion of a computing system including a PCI implementation handling multiple packets in a single cycle or multiple cycles where each cycle has one or more packets arriving at a queue of the PCI implementation in one or more embodiments. In these embodiments illustrated in FIG. 1A, the portion of the computing system includes a processor 120A (e.g., a central processor unit or CPU) that is operatively connected to memory 122A and a root complex 102A of a Peripheral Component Interconnect (PCI) implementation. In some embodiments, the PCI implementation may include a PCI Express (PCIe) expansion bus architecture. It shall be noted that although various embodiments refer to PCIe, various techniques described here are not limited to PCIe computer expansion bus, these techniques are not limited to only the PCIe bus and may generally apply to other serial computer expansion buses.

The root complex 102A may be operatively connected to and transmit packets among a PCIe bridge (116A), one or more PCIe endpoints (e.g., 108A, 110A, 112A, and 114A), one or more legacy PCI and/or PCI-X (Peripheral Component Interconnect eXtended) endpoints (e.g., 118A) via, for example, a PCIe bridge (116A) to PCI-X or PCI, or any combinations thereof. PCIe protocol encapsulates PCIe communication in packets by packetizing and de-packetizing data as well as status-message communication with the transaction layer of a PCIe port. Packets may thus be transmitted from a PCIe device upstream port (e.g., 123A) represented as rectangles in FIG. 1A to a PCIe device downstream port (e.g., 124A) represented as gray rectangles in FIG. 1A.

Figure 1B:
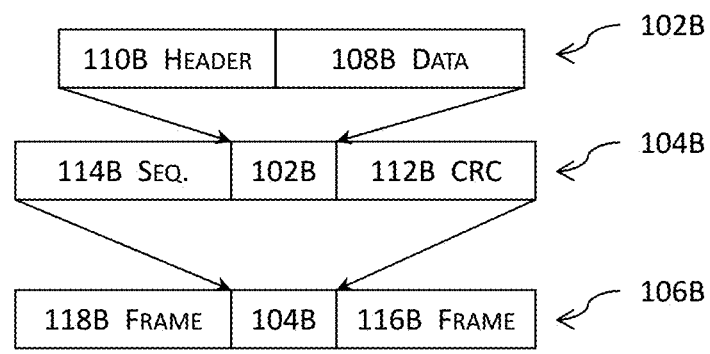
FIG. 1B illustrates simplified structures of data packets transmitted in a PCIe architecture in one or more embodiments.

FIG. 1B illustrates simplified structures of data packets transmitted in a PCIe architecture in one or more embodiments. To transmit a packet from a PCIe endpoint, by the transaction layer may first append a header to the data payload to form a transaction layer packet (TLP) 102B, which may then be transmitted to the data link layer (DLL) of the PCIe endpoint and then to the physical layer (PHY) for further processing. 102B represents an example of a simplified structure of a transaction layer packet (TLP) that includes a header 110B and the data payload 108B. A data payload may include, for example, double words of various sizes ranging from zero to 1024 double words, and the header 110B may be three (3) to four (4) double words in some embodiments.

Once a TLP is transmitted from the transaction layer to the data link layer, the data link layer initializes and manages flow control credits and sequences the TLP by generating and appending a sequence number or identification tag 114B to the front of the TLP 102B as well as a cyclic redundancy check (CRC) code 112B (e.g., a 32-bit CRC code) or a link CRC code to the end of the TLP to form a data link layer packet (DLLP) 104B to ensure reliable delivery of the TLP between two endpoints. The data link layer packet is further transmitted to the physical layer (PHY) which appends a start frame 118B to the front of the DLLP and an end frame 116B to the end of the DLLP 104B to form the physical layer packet 106B.

The physical layer may then transmit the physical layer packet 106B via a physical layer interface (e.g., a PHY Interface for PCI Express or PIPE) to, for example, an application layer or a software layer (not shown in FIG. 1B). On the receiving side, the PHY layer of a PCIe endpoint receives a physical layer packet (106B) at a downstream port, extract the data link layer packet 104B from the physical layer packet (106B), and transmit the data link layer packet to the data link layer. The data link layer may further extract the transaction layer packet (102B) and transmit the TLP back to the transaction layer which further decode the TLP and extract the data payload 108B. More details about transmission and receipt of TLPs are provided below with reference to FIGS. 1C-D and 2B-C. More details about some simplified structures of a PCIe architecture are described below with reference to FIG. 1E.

Figure 1C:
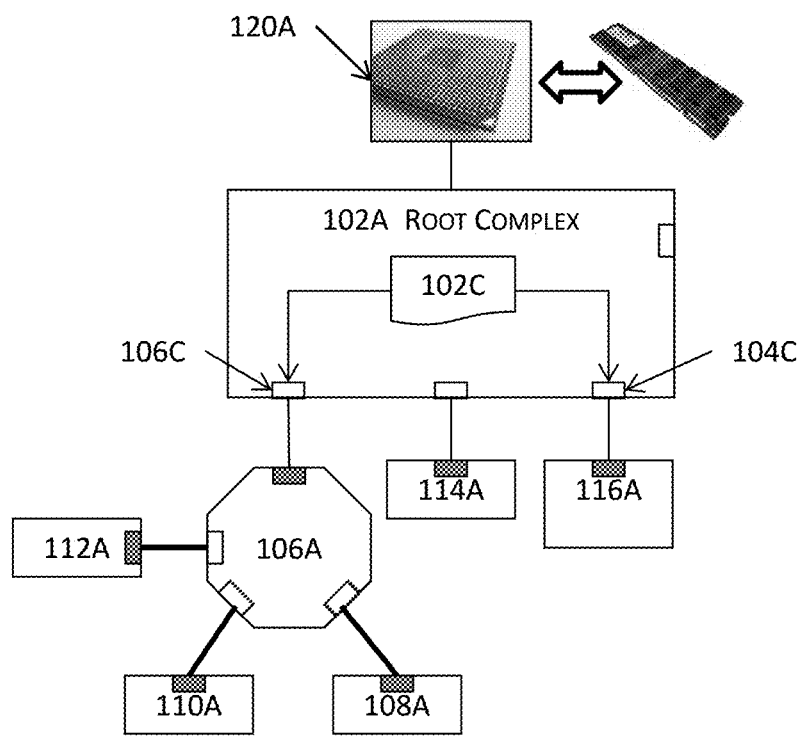
FIG. 1C illustrates a simplified example of a processor performing a posted transaction over a PCIe architecture in one or more embodiments.

FIG. 1C illustrates a simplified example of a processor performing a posted transaction over a PCIe architecture in one or more embodiments. In these embodiments illustrated in FIG. 1C, the processor 120A may perform a posted transaction or operation over the illustrated, simplified PCIe architecture. A posted operation may include, for example, memory write operations, messages, etc. in some embodiments. For posted operations, a requester transmits a request TLP to a completer, and the completer does not return a completion TLP to the requester to confirm the delivery or receipt of the request TLP. The requester of these posted operations does not require a completion TLP from the completer. Rather, the requester assumes that the posted operation is successful because the ACK (acknowledgement) and NAK (non-acknowledgement) protocol guarantees successful transmission of the TLP.

In this example illustrated in FIG. 1C, the processor 120A performs a posted operation such as a write operation to write data payload over PCIe. Upon receiving the write request from the processor 120A, the root complex 102A, which may include the memory controller chipset connected the processor's system bus and the PCIe architecture, generates a memory write packet 102C. The memory write packet 102C may be transmitted on the PCIe port (e.g., 104C or 106C) and routed to the destination PCIe endpoint that may be directly connected to the root complex 102A or indirectly via a switch network 106A.

For example, the memory write packet 102C may be routed to the destination PCIe endpoint 116A via PCIe port 104C. As another example, the memory write packet 102C may be transmitted to the switch network 106A via PCIe port 106C and then routed to PCIe endpoint 108A operatively connected to the switch network 106A. The destination PCIe endpoint may be referred to as the completer for the memory write packet. As described above, the request TLP (e.g., the memory write packet) in this example constitutes a posted packet, and the completer thus does not return a completion TLP in response to the request TLP. Rather, the requester (e.g., the processor) assumes the successful transmission of the request TLP by the ACK/NAK protocol's guarantee of successful transmission of posted operations. In these embodiments, a posted operation includes only the request TLP, but not the completion TLP.

Figure 1D:
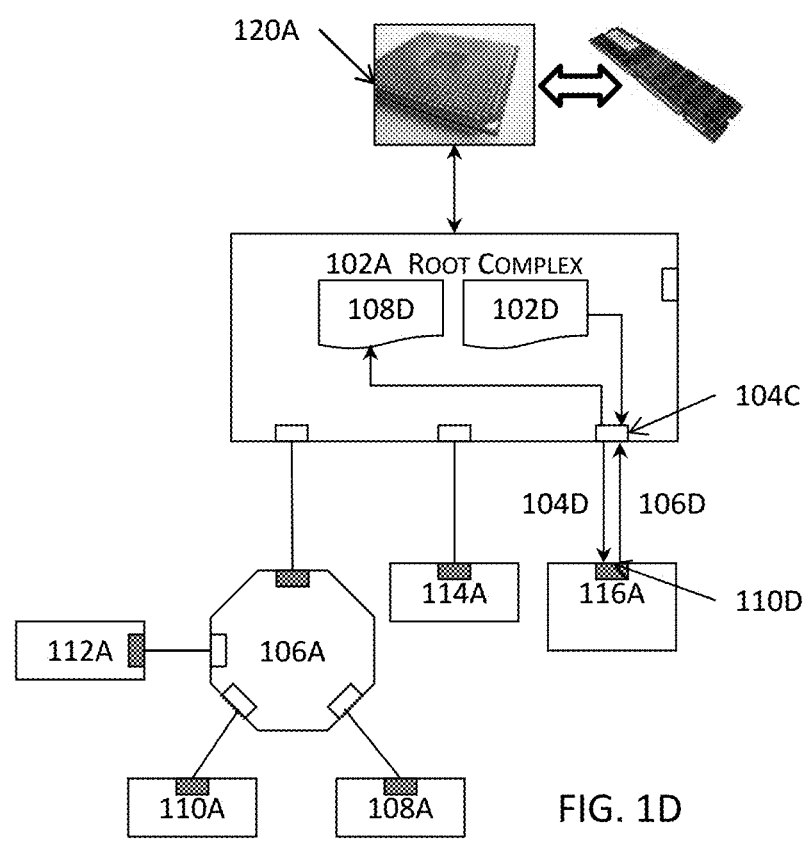
FIG. 1D illustrates a simplified example of a processor performing a non-posted transaction over a PCIe architecture in one or more embodiments.

FIG. 1D illustrates a simplified example of a processor performing a non-posted transaction over a PCIe architecture in one or more embodiments. In these embodiments illustrated in FIG. 1D, the processor 120A may perform a non-posted transaction or operation over the illustrated, simplified PCIe architecture. A non-posted operation may include, for example, a memory read operation, a memory read lock operation, an IO read operation, an IO write operation, a type 0 or type 1 configuration read operation, a type 0 or type 1 configuration write operation, etc.

For the ease of explanation and illustration, the non-posted operation referred to herein is a memory read request. In these embodiments, the processor 120A reads from a PCIe endpoint. The root complex 102A (e.g., a memory controller chipset) may generate a memory read request transaction layer packet (TLP) 102D which is then routed through the transaction layer, the data link layer, and the physical layer of the root complex 102A to, for example, the PCIe endpoint 116A via path 104D and PCIe upstream port 104C. The PCIe endpoint 116A receives the memory read request TLP 102D via the root port 104C and the downstream port 110D.

In response to the memory read request TLP 102D, the transaction layer of the PCIe endpoint 116A reads from its internal resources and generates a completion TLP 108D that encapsulates, for example, the data payload to fulfill the memory read request TLP 102D, the virtual channel identification of the completer, and the completer ID which identifies the entity or sender of the completion TLP 108D. In some of these embodiments, a completion TLP may also include a requester ID which identifies the receiver of the completion TLP. In addition, the completion TLP may further include the length field (e.g., one double word) for the data payload, the address field for the data payload, and/or the type of the request (e.g., a read request in this example) in some embodiments. In this example, the PCIe endpoint 116A may transmit the memory read request TLP 108D from the downstream port 110D and the root port 104C back to the root complex 102A in response to the memory read request TLP 102D.

A virtual channel identification (e.g., the value specified in the TC or traffic control field of a TLP) identifies and may thus be used to create a virtual channel that corresponds to a separate set of data buffers subject to a separate flow control credits and counters in a PCIe architecture in some embodiments. For example, when choosing a TC value other than "0", the TLP may be subject to an independent flow control mechanism to prevent TLPs belonging to one channel from blocking the traffic of other TLPs belonging to another channel. In some embodiments, the firmware or software code may be used to perform and/or maintain the mapping between traffic control parameter values to virtual channels.

The completion TLP is transmitted from the PCIe endpoint 116A to the root complex 102A via the path and PCIe port 110D. The root complex 116A receives the completion TLP 108D at port 104C via path 106D and, depending upon the requester of the read request TLP 102D, process the completion TLP 108D to determine the corresponding read request TLP and retrieve the data payload to fulfill the read request TLP by, for example, transmitting the data payload to the data lines of the requester. In these embodiments, a non-posted operation includes a request and a completion. A non-posted operation thus retains information about what the request is and waits for completion when the completion packet arrives.

Figure 1E:
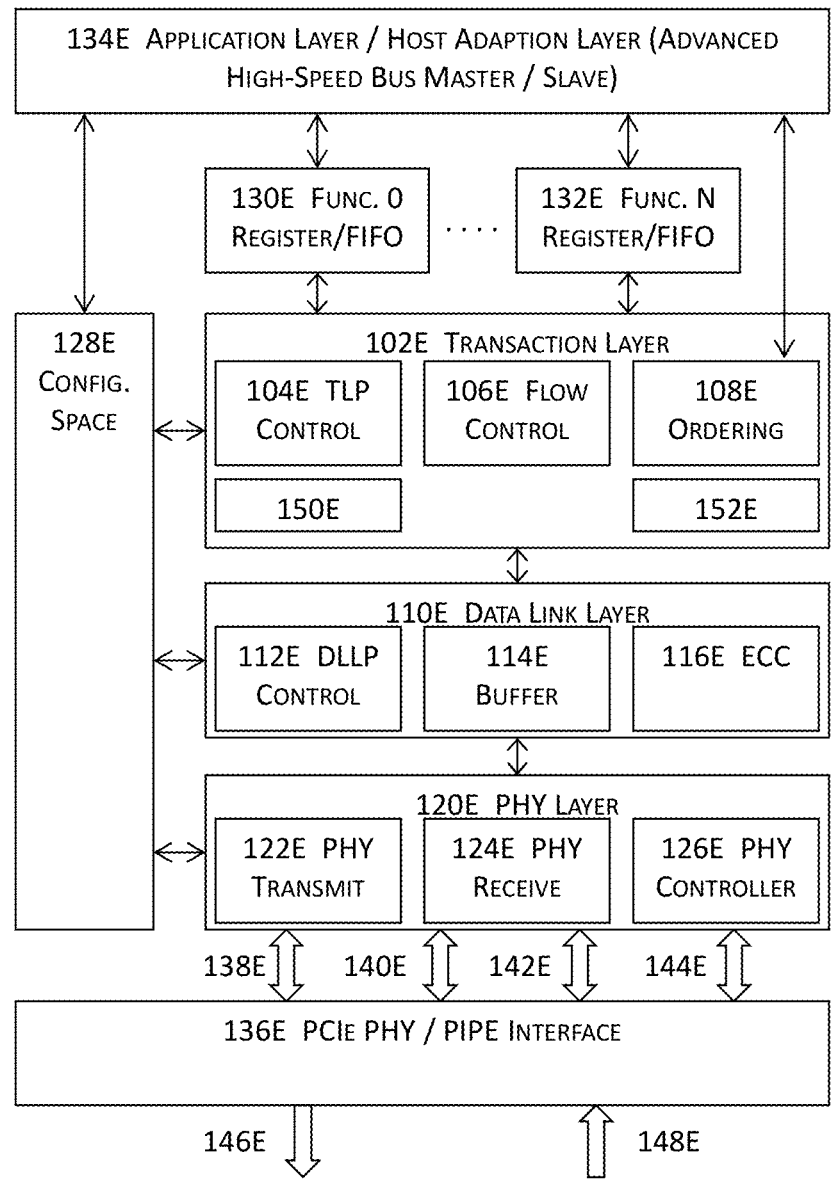
FIG. 1E illustrates a schematic of a PCIe architecture in one or more embodiments.

FIG. 1E illustrates a schematic of a PCIe architecture in one or more embodiments. In these embodiments, the PCIe architecture includes the transaction layer 102E communicably coupled with the data link layer 110E that is further communicably coupled with the physical layer 120E. The transaction layer, data link layer 110E, and the physical layer 120E are further communicably coupled with the configuration space or extended configuration space 128E. A device function includes its own configuration space which comprises a sets of register or flip-flops that are mapped to memory locations to which device drivers, diagnostic software, and/or operation system (via application programming interfaces) have access.

The configuration space may be further coupled with an application layer, a host adaption layer e.g., an advanced high-speed bus (AHB) master or slave, an advanced extensible interface (AXI), etc. (collectively 134E). A PCIe architecture as illustrated in FIG. 1E may include a plurality of device functions (130E and 132E) that may be accessed by the transaction layer 102E. The PCIe architecture illustrated in FIG. 1E may further include a PCIe physical interface 136E such as a PHY interface for PCI Express (PIPE). The physical interface 136E is operatively coupled with the physical layer via multiple PCIe lanes (e.g., 138E, 140E, 142E, and 144E) that form a PCIe link. The PCIe physical interface further includes a downstream port 148E to receive packets from and an upstream port 146E to transmit packets to external circuitry.

The transaction layer 102E of a PCIe architecture splits transactions with request and response by time to permit the PCIe link to carry other traffic while a target device gathers data for the response. The transaction layer 102E may include the TLP control mechanism 104E that generates a transaction layer packet by appending the header to the beginning of data payload. The transaction layer 102E may also include one or more buffers including, for example, one or more transmit buffers 150E to transmit TLPs and/or one or more receive buffers 152E to receive TLPs. TLPs may arrive in an order that is different from how these TLPs are sent.

The transaction layer 102E may thus include an ordering mechanism 108E that orders or re-orders transaction layer packets based on a set of ordering rules to, for example, avoid deadlocks. The set of ordering rules may include, for example, a first ordering rule that requires that a completion TLP cannot pass posted TLPs. The first ordering rule may be hard rule, which must be complied with, or a conditional ordering rule that is enforced when a certain condition is fulfilled. For example, a relaxed ordering rule for the first ordering rule may require that a completion TLP cannot pass posted TLPs if the completer identification of the completion TLP matches the requester identifications of the posted TLPs.

Under this relaxed ordering rule, a completion TLP may pass posted TLPs and may thus be dequeued from the completion buffer (e.g., one or more receive buffers 152E) if the completer identification of the completion TLP does not match the requester ID of a posted TLP. Under the PCIe specification, a write request TLP may arrive before a read request TLP even if the write request TLP is sent after the read request TLP. Therefore, a completion TLP in response to a read request TLP is thus sent after the read request TLP and hence cannot pass write request TLPs having matching requester identifications. Completion TLPs thus arrive at the completion buffer with rising addresses, and the pointers for the completion buffer thus correspond to the temporal sequence or order in which these completion TLPs are received.

In these embodiments, one or more buffers in the transaction layer 102E are used not only for packet ordering and flow control purposes but also for identification-based and pointer-based ordering. More details about the identification-based and pointer-based order of packets are described in the following paragraphs with reference to FIGS. 2A-3E. The set of ordering rules may also include a second ordering rule that specifies that posted write request TLPs such as memory write request TLPs or MSIs (message signaled interrupts) arrive in the order they were sent. The set of ordering rules may further include a third ordering rule that specifies that a read request TLP will not pass a posted TLP or MSI that was sent before the read request TLP.

In some embodiments, a transaction layer includes a flow control mechanism 106E for credit-based flow control. There may be one or more credit types in a credit-based flow control mechanism. For example, the credit-based flow control may implement independent accounting for one or more buffer consumers including, for example, posted requested TLP's headers, posted requests TLP's data, non-posted requests TLP's headers, non-posted requests TLP's data, completion TLP's headers, and/or completion TLP's data.

In a PCI architecture, failure to deliver a transaction layer packet constitute a major malfunction. One of the purposes of a data link layer 110E is to use the ACK and NAK protocol to ensure that a transaction layer packet arrives at its destination correctly and to replay an unacknowledged TLP by using a replay buffer 114E. When a data link layer transmits a packet, the data link layer generates an incrementing sequence number for each TLP to be transmitted. The data link layer 110E further appends the data link layer's own header to the beginning of a transaction layer packet and a link CRC (cyclic redundancy check) code (e.g., a 32-bit CRC code) to the end of the transaction layer packet with the error control code (ECC) mechanism 116E to ensure the integrity of the transaction layer packet. A data link layer 110E may further comprise a data link layer packet control sublayer 112E to initialize and manage flow control credits When a data link layer receives a transaction layer packet, the data link layer 110E validates one or both the sequence number and the cyclic redundancy check code and discards an invalid or bad transaction layer packet and TLPs received after the invalid or bad TLP when at least one of the sequence number or the cyclic redundancy check code fails the validation. A negative acknowledgement message (NAK) will be transmitted together with the sequence number of the invalid or bad TLP to request re-transmission of one or more TLPs forward of the sequence number. The physical layer 120E may include a physical transmit sublayer 122E for transmitting packets to the data link layer 110E or the PCIe interface 136E, a physical receive sublayer 124E to receive packets from the data link layer 110E or the PCIe interface 136E, and a physical layer controller 126E. The physical layer 120E may also be operatively coupled with the configuration space 128E in some embodiments.

Figure 2A:
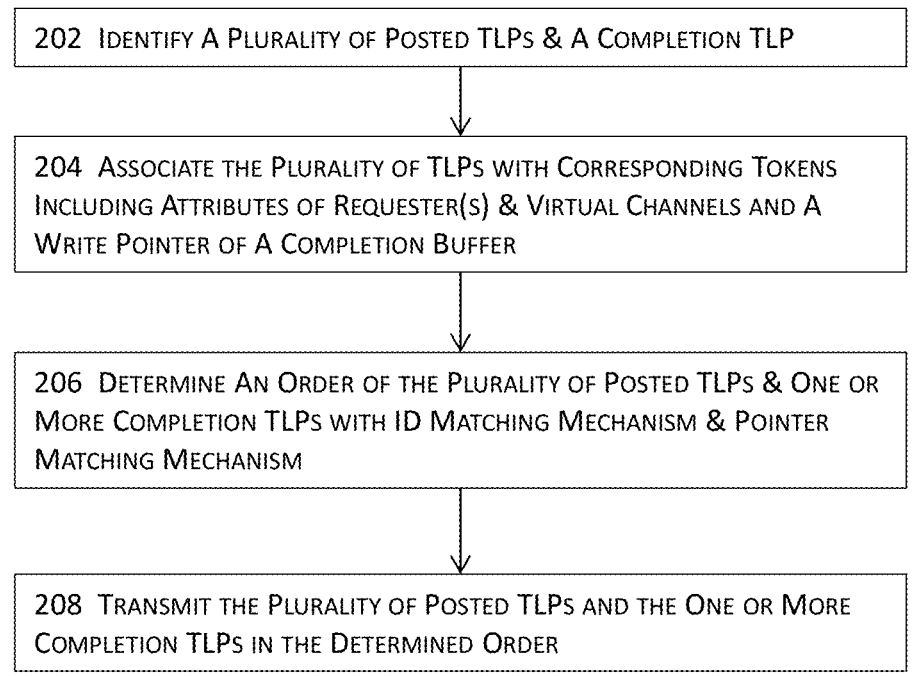
FIG. 2A illustrates a high-level block diagram for implementing a PCI implementation handling multiple packets in a single cycle or multiple clock cycles in one or more embodiments.

FIG. 2A illustrates a high-level block diagram for implementing a PCI implementation handling multiple packets in one or more embodiments. More specifically, FIG. 2A illustrates a high-level block diagram for implementing pointer-based and identification-based ordering of packets in a PCIe implementation. In these embodiments, a plurality of posted transaction layer packets may be identified at 202. The plurality of posted transaction layer packets may arrive at a queue (e.g., a posted queue or a receive buffer in a transaction layer) in a single clock cycle in some embodiments or in multiple clock cycles where one or more posted transaction layer packets arrive in each clock cycle of these multiple clock cycles in some other embodiments. For example, two TLPs may arrive at a posted buffer of a PCIe controller in a clock cycle in a 256-bit datapath PCIe implementation.

A completion TLP in response to a non-posted request or operation may also be identified at 202. In some embodiments, the completion TLP identified at 202 includes the completion TLP at the head of the completion buffer (e.g., a receive FIFO of a transaction layer of a PCIe implementation). Under the PCIe specification, a posted TLP (e.g., a write request TLP) may arrive before a non-posted TLP (e.g., a read request TLP) even if the posted TLP is sent after the non-posted TLP. Therefore, a completion TLP in response to a non-posted TLP is thus sent after the non-posted TLP and hence cannot pass write posted TLPs having matching requester identifications. Completion TLPs thus arrive at the completion buffer with rising addresses, and the pointers for the completion buffer thus correspond to the temporal sequence or order in which these completion TLPs are received.

A posted operation may include, for example, memory write operations, messages, etc. in some embodiments. For posted operations, a requester transmits a request TLP to a completer, and the completer does not return a completion TLP to the requester to confirm the delivery or receipt of the request TLP. The requester of these posted operations does not require a completion TLP from the completer. Rather, the requester assumes that the posted operation is successful because the ACK (acknowledgement) and NAK (non-acknowledgement) protocol guarantees successful transmission of the TLP.

Figure 2B:
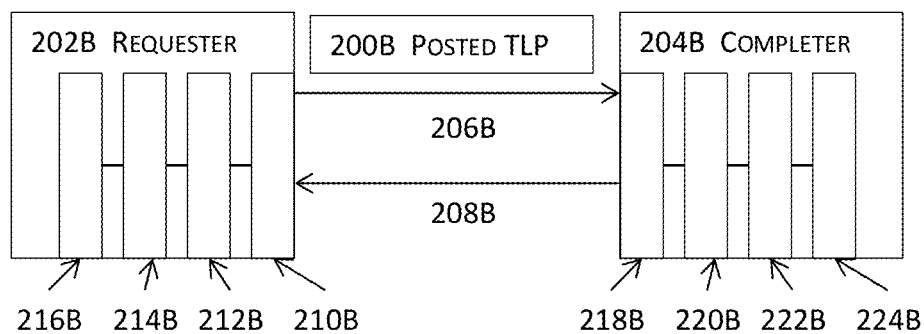
FIG. 2B illustrates a simplified schematic diagram of transmitting a posted transaction layer packet between a requester and a completer in one or more embodiments.

FIG. 2B illustrates a simplified schematic diagram of transmitting a posted transaction layer packet between a requester and a completer in one or more embodiments. In these embodiments illustrated in FIG. 2B, a requester 202B transmits a posted TLP (e.g., a memory write request TLP) 200B via PCIe link including the transmit path 206B (and the receive path 208B) to the completer 204B which is to fulfill the posted TLP 200B. More specifically, transaction layer 214B coupled with the device core 216B of the requester 202B generates a TLP by appending the header to the data payload.

The TLP is transmitted from the transaction layer 214B to the data link layer 212B which further appends its own header and CRC code to the beginning and the end of the TLP to generate the data link layer packet (DLLP). The DLLP is further transmitted from the data link layer 212B to the physical layer 210B which appends the start frame and the end frame to the DLLP to generate the posted TLP 200B. The physical layer 210B then transmits the posted TLP 200B via a transmit path 206B of a PCIe lane to the physical layer 218B of the completer 204B.

The posted TLP is then transmitted and processed through the data link layer 220B and the transaction layer 222B coupled with the device core 224B of the completer which then fulfill the request by, for example, writing the data payload into the internal resources of the completer 204B. A posted TLP does not require a completion TLP from the completer. Rather, the requester 202B assumes that the posted operation is successful because the ACK/NAK protocol guarantees successful transmission of the posted TLP to the completer 204B. Therefore, no completion TLP is transmitted from the completer 204B back to the requester 202B in response to the posted TLP 200B.

Figure 2C:
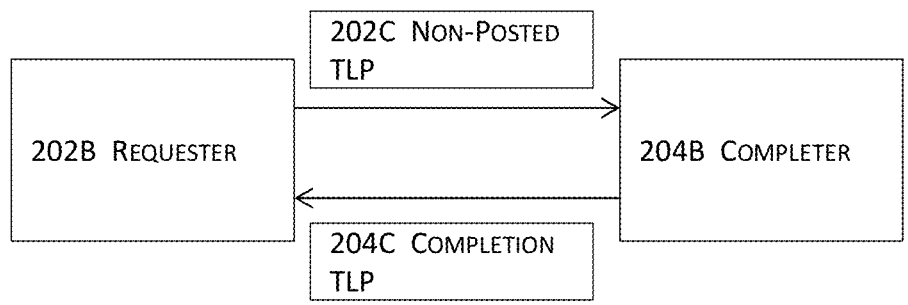
FIG. 2C illustrates a simplified schematic diagram of transmitting a non-posted transaction layer packet between a requester and a completer in one or more embodiments.

In contrast, a non-posted operation includes a request and a completion and retains information about what the request is and waits for completion when the completion packet arrives. A non-posted operation may include, for example, a memory read operation, a memory read lock operation, an IO read operation, an IO write operation, a type 0 or type 1 configuration read operation, a type 0 or type 1 configuration write operation, etc. FIG. 2C illustrates a simplified schematic diagram of transmitting a non-posted transaction layer packet between a requester and a completer in one or more embodiments. In these embodiments, the requester 202B transmits a non-posted TLP 202C (e.g., a memory read request) to the completer 204B. Unlike the example illustrated in FIG. 2B involving a posted operation, the completer 204B transmits a completion TLP 204C in response to the received non-posted TLP 202C. In the example of a memory read request TLP from the requester 202B, the completer 204B returns the completion TLP 204C that includes the data payload to fulfill the memory read request, the completer identification, the virtual channel identification, etc.

At 204, the identified plurality of posted TLPs may be associated with corresponding ordering tokens. An ordering token may be allocated when a posted operation enters, for example, a posted buffer and de-allocated when the posted TLP is de-queued from the posted buffer and forwarded to the application layer in some embodiments. An ordering token may comprise one or more attributes. In some embodiments, the one or more attributes may comprise one or more pieces of data or information including, for example, a requester ID of a TLP with which the ordering token is associated, a virtual channel identification of the TLP, the write pointer of a completion buffer (e.g., a receive buffer of a TLP layer of a PCIe implementation), etc.

At 206, an order of the plurality of posted TLP and one or more completion TLPs may be determined with an identification-based matching mechanism and a pointer-based matching mechanism. The order may be used to determine which TLP is to be de-queued, or which TLP is to wait before one or more other TLPs are transmitted. For example, the write pointer stored in an ordering token associated with a posted operation may be compared to the current read pointer of the completion buffer in which completion TLPs are queued. If it is determined that the write pointer of the ordering token matches the current read pointer of the completion buffer, the requester identification and the virtual channel identification stored in the ordering token are further respectively compared to the completer identification and the virtual channel identification of the identified completion TLP.

If it is again determined that there is an identification match (e.g., the requester identification matches the completer identification, and the virtual channel identification in the ordering token matches the virtual channel identification of a completion TLP), the completion TLP at the head of the completion buffer is determined to have arrived after the posted TLP associated with the ordering token have the matching write pointer. The completion TLP thus waits for the posted TLP associated with the ordering token having matching requester and virtual channel identifications.

In this example, the completion is not de-queued from the completion buffer until the posted TLP is de-queued from the posted buffer. One of the advantages of some techniques for PCI implementation is that the completion buffer is used not only for packet ordering and flow control purposes but also for identification-based and pointer-based ordering and is thus silicon-area efficient because these techniques use existing buffer structures for identification-based ordering of packets without requiring additional structures in the PCI implementation.

Various logic and instructions (collectively logic elements or a logic element) such as those for identification-based, pointer-based, and/or virtual channel-based matching logic be implemented in various software, hardware, or a combination of hardware and software forms and stored in various existing hardware elements without requiring additional hardware components. For example, various logic and instructions may be stored in firmware, ROM (read-only memory), PROM (programmable read-only memory), EEPROM (electrically erasable programmable read-only memory), buffers, or any other suitable, existing non-volatile memory.

These logic and instructions leverage various pointers, linking structures, or symbolic links, addressing registers or flops (collectively pointer or pointers), various identifications, identifiers, numbers, etc. (collectively identification or identifications) that are already existing in a PCI implementation to automatically route packets according to an order determined by these logic and instructions.

In addition, these matching mechanisms and techniques (e.g., the pointer-based and the identification-based matching mechanisms) described herein do not introduce any additional variables, attributes, properties, or parameters in determining an order for handling (e.g., de-queuing) completion TLPs and posted TLPs. Rather, these matching mechanisms and techniques utilize the parameters, variables, properties, and/or attributes (collectively attributes or an attribute) that already exist in any PCIe or PCI implementations. For example, these mechanisms or techniques utilize read pointers and write pointers of a receive buffer (e.g., a completion buffer for storing completion TLPs), the requester identifications and virtual channel identifications that already exist in posted TLPs, and the completer identifications that already exist in completion TLPs to determine the order of handling (e.g., de-queuing) posted and completion TLPs while maintain a proper temporal sequence among these TLPs without introducing any new attributes, variables, properties, or parameters.

It shall be noted that although the matching mechanisms or techniques may include additional logic to compare some attributes to each other, such additional logic nevertheless occupies very little space or require very few circuit elements. Therefore, such additional logic imposes very little or even minimal impact on the silicon area of the PCI implementation described herein in some embodiments, and the PCI implementation is thus considered silicon-area efficient in these embodiments.

These techniques leverage the property that completion TLPs arrive at the completion buffer with rising addresses, and that the pointers for the completion buffer thus correspond to the temporal sequence or order in which these completion TLPs are received. It shall be noted that the aforementioned example illustrates a match with one ordering token. In some embodiments, more than one ordering token may include the requester identification and virtual channel identification that respectively match the completer identification and virtual channel identification of a completion TLP. In these embodiments, the completion TLP also waits for these multiple posted TLPs corresponding to the more than one ordering token for de-queuing. At 208, the plurality of posted TLP and the one or more completion TLPs are transmitted (e.g., de-queued) according to the order determined at 206.

Figure 3A:
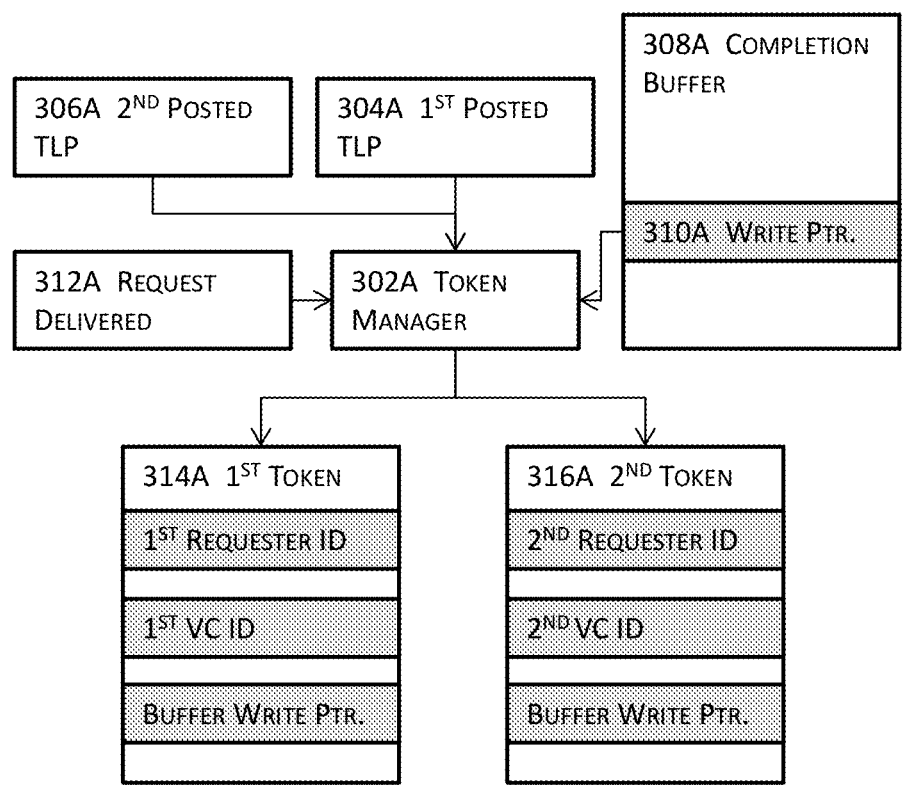
FIG. 3A illustrates a simplified block diagram for processing packets with pointer matching mechanism and ID matching mechanism in one or more embodiments.
Figure 3B:
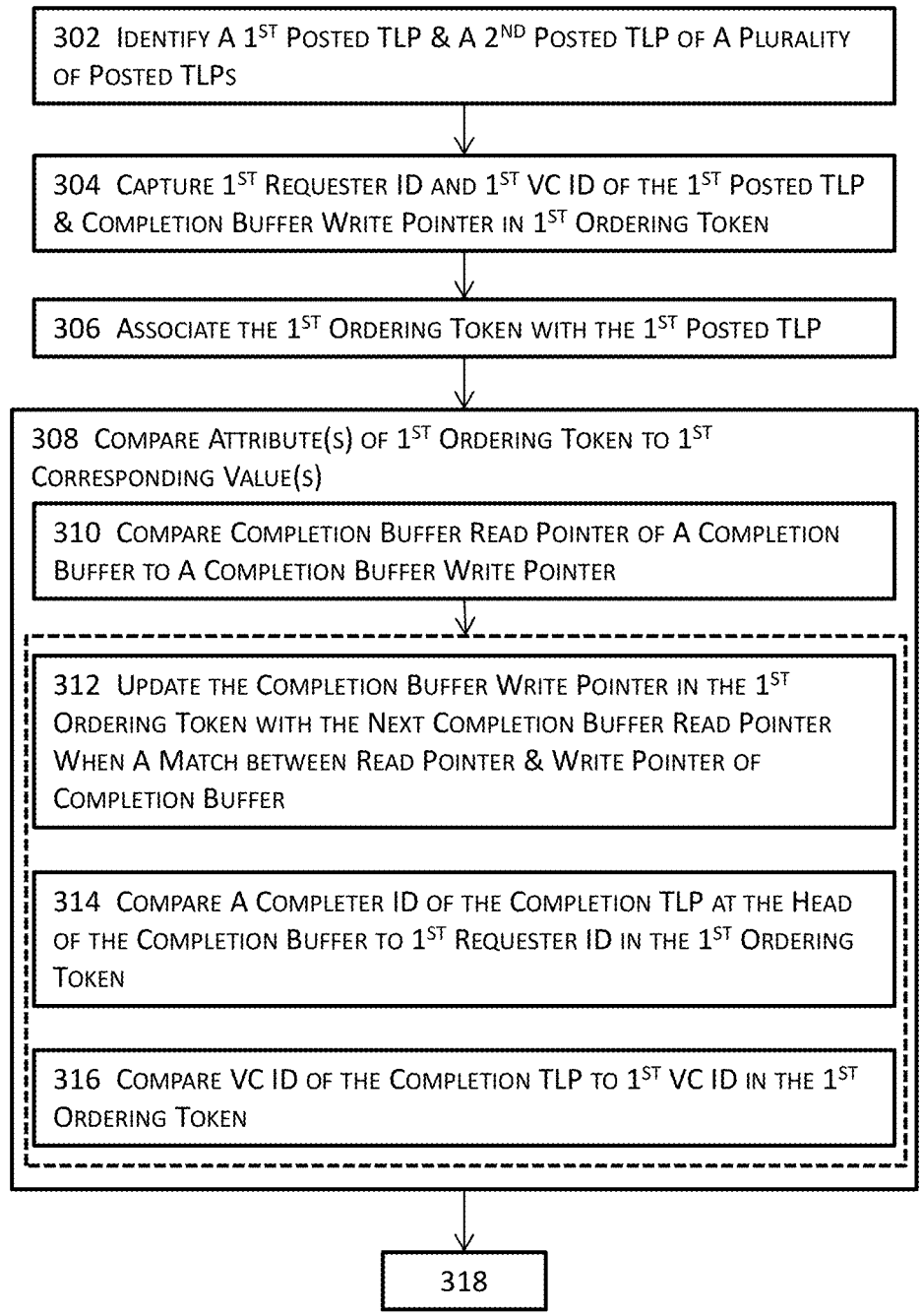
FIGS. 3B-E jointly illustrate a more detailed block diagram for processing packets with pointer matching mechanism and ID matching mechanism in one or more embodiments.
Figure 3C:
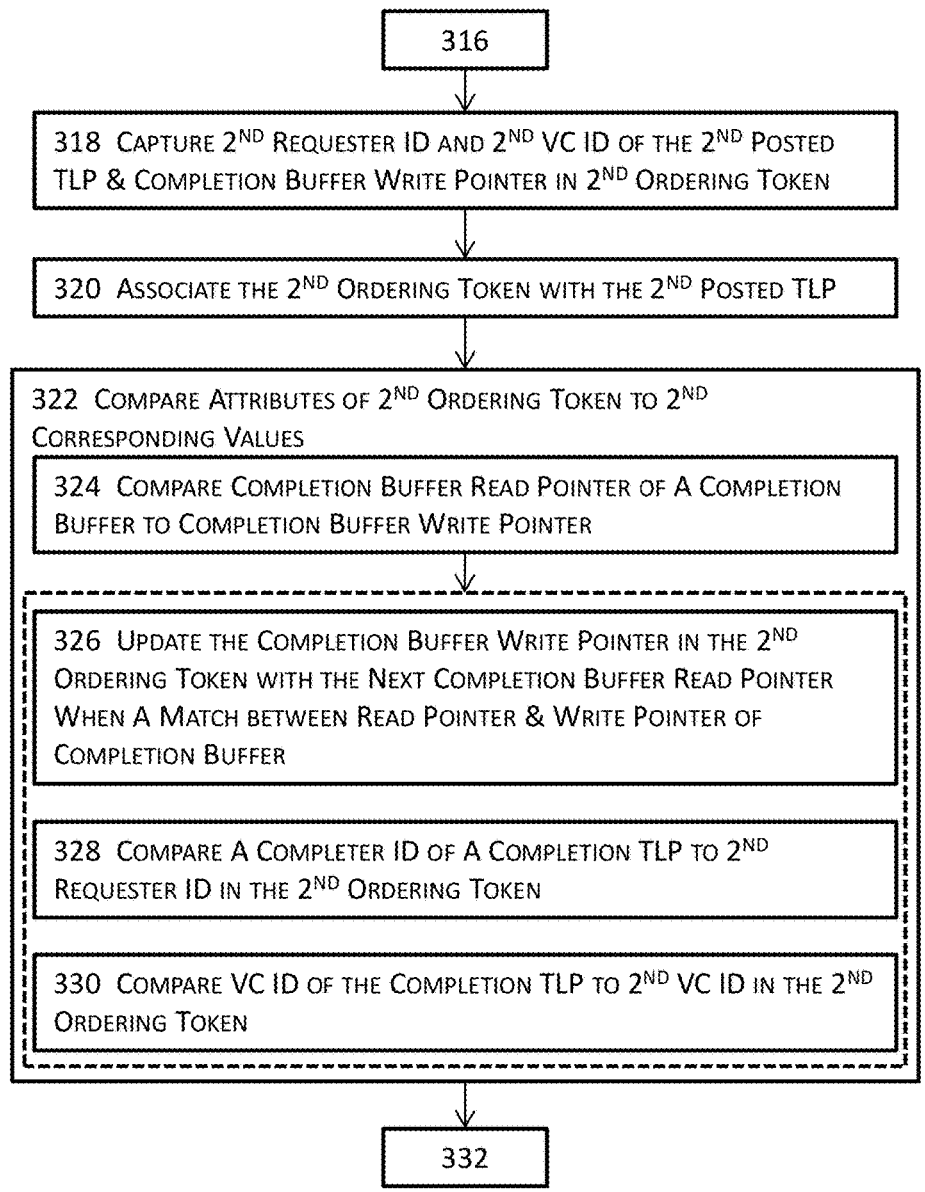

FIG. 3A illustrates a simplified block diagram for processing packets with pointer matching mechanism and ID matching mechanism in one or more embodiments. More specifically, FIG. 3A illustrates a schematic block diagram for associating ordering tokens with transaction layer packets. In these embodiments, a token manager or token management mechanism 302A in a PCI implementation identifies a first posted TLP 304A and a second posted TLP 306A when the first and second posted TLPs (304A and 306A) enter, for example, a posted or receive buffer of a PCIe endpoint. The token management mechanism 302A may also identify the write pointer 310A of the completion buffer 308A.

In some embodiments, the token management mechanism 302A may also identify request delivered message or packet 312A. The token management mechanism 302A may then generate and associate a first ordering token 314A with the first posted TLP 304A and a second ordering token 316A with the second posted TLP 306A. The first ordering token 314A may include the first requester identification and the first virtual channel identification of the first requester as well as the completion buffer write pointer 310A in some embodiments. The second ordering token 316A may include the second requester identification and the second virtual channel identification of the second requester as well as the completion buffer write pointer 310A in some embodiments.

FIGS. 3B-E jointly illustrate a more detailed block diagram for processing packets with pointer matching mechanism and ID matching mechanism in one or more embodiments. In these embodiments, a first posted TLP and a second posted TLP of a plurality of posted TLPs may be identified at 302. In some embodiments, the first and second posted TLPs may arrive at, for example, a posted buffer in a PCIe endpoint during the same clock cycle. The first requester identification and the first virtual channel identification of the first requester may be captured at 304. In addition, the write pointer of a completion buffer (e.g., a receive buffer in a transaction layer of a PCIe endpoint) may also be identified at 304.

The first posted TLP may then be associated with a first ordering token at 306. At 308, one or more attributes of the first ordering token may be compared to their corresponding values. For example, the completion buffer read pointer may be compared to the completion buffer write pointer stored in the first ordering token at 310. In some embodiments where it is determined that a pointer match is found, the write pointer captured in the first ordering token may be updated at 312 with the next completion buffer read pointer. In these embodiments, the completion buffer read pointer is determined not to match the completion buffer write pointer, and the completion buffer write pointer captured in the first ordering token is not updated or replaced with the next completion buffer read pointer.

In some of these embodiments where a pointer mismatch is found, the process may process the next posted TLP without further processing the particular posted TLP corresponding to the ordering token having the pointer mismatch with the completion TLP. In some other embodiments where a pointer match between the read pointer of the completion buffer and the write pointer captured in the first ordering token is found, the write pointer in the ordering token is updated, and the completer ID of a completion TLP may be further compared to the requester ID captured in the first ordering token at 314 to determine whether the completer identification is identical to or different from the requester identification. In these embodiments, the first virtual channel identification captured in the first ordering token may further be compared to the virtual channel identification for the completion TLP at 316 to determine whether these two identifications are identical or different.

The second requester identification and the second virtual channel identification of the second requester sending the second posted TLP may be captured at 318. In addition, the write pointer of a completion buffer (e.g., a receive buffer in a transaction layer of a PCIe endpoint) for the second posted TLP may also be identified at 318. The second posted TLP may then be associated with a second ordering token at 320. At 322, one or more attributes of the second ordering token may be compared to their corresponding values. For example, the completion buffer read pointer may be compared to the completion buffer write pointer stored in the second ordering token at 324.

In some embodiments where it is determined that a pointer match is found, the write pointer captured in the second ordering token may be updated at 326 with the next completion buffer read pointer. In these embodiments, the completion buffer read pointer is determined not to match the completion buffer write pointer captured in the second ordering token, and the completion buffer write pointer captured in the second ordering token is not updated or replaced with the next completion buffer read pointer. In some of these embodiments where a pointer mismatch is found, and the process may process the next posted TLP without further processing the particular posted TLP corresponding to the ordering token having the pointer mismatch with the completion TLP.

In some other embodiments where a pointer match between the read pointer of the completion buffer and the write pointer captured in the second ordering token is found, the write pointer in the second ordering token is updated, the completer ID of a completion TLP may be further compared to the requester ID captured in the second ordering token at 328 to determine whether the completer identification is identical to or different from the requester identification. In these embodiments, the second virtual channel identification captured in the second ordering token may further be compared to the virtual channel identification for the completion TLP at 330 to determine whether these two identifications are identical or different.

Figure 3D:
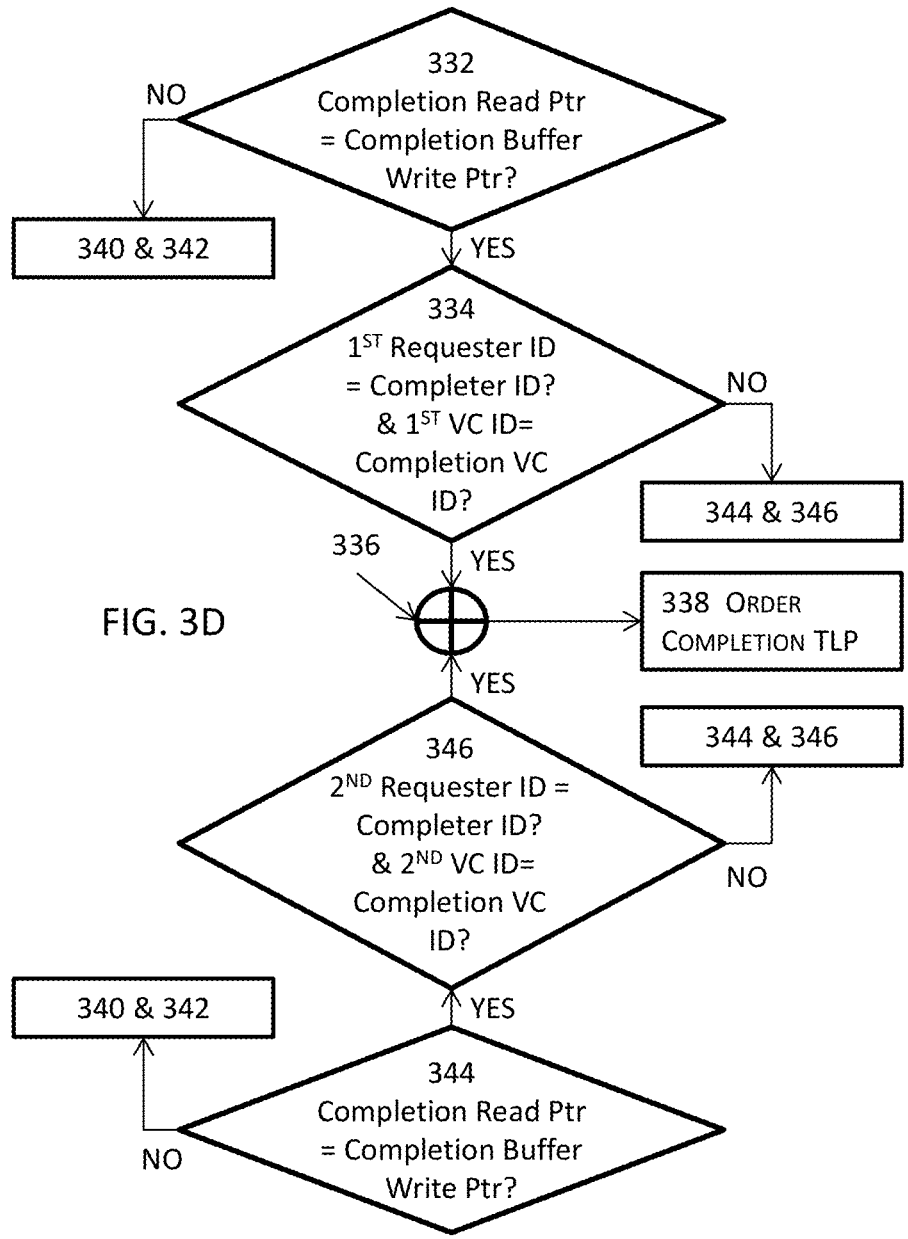
Figure 3E:
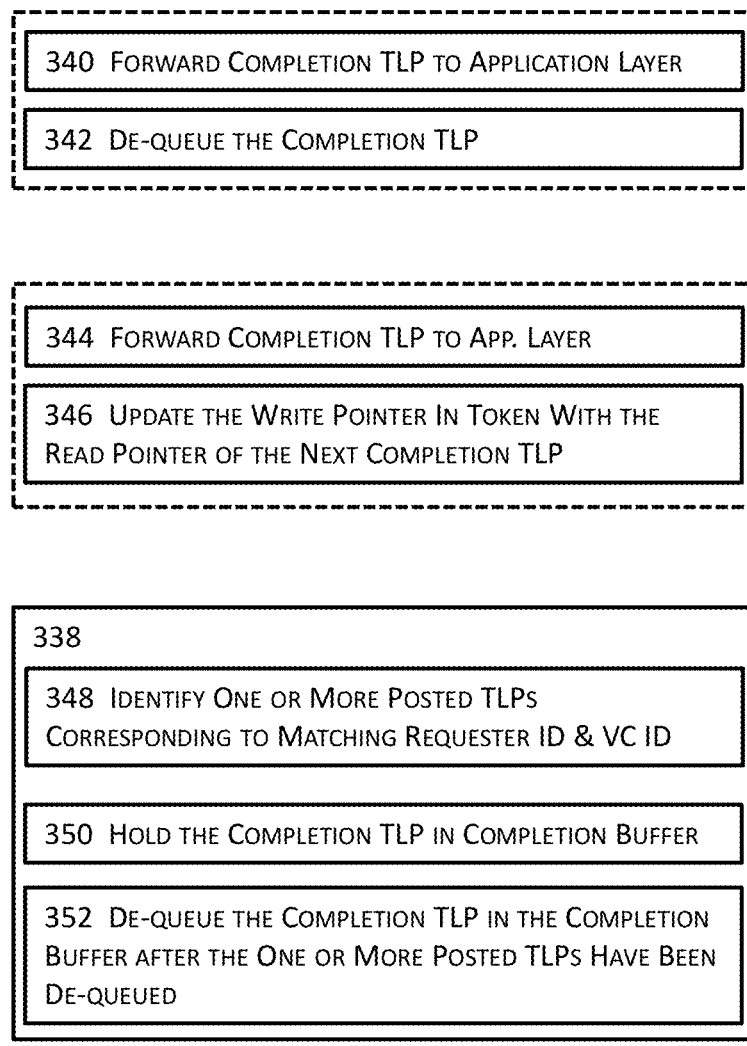

FIG. 3D illustrates a block diagram for the identification-based and pointer-based packet ordering in one or more embodiments. At 332, a completion buffer read pointer for a completion TLP is compared to a completion buffer write pointer for a posted TLP. If it is determined that completion buffer read pointer for the completion TLP is different from the completion buffer write pointer at 332, 340 and 342 may be performed. More specifically, in some embodiments where there is a pointer match and an identification mismatch, the completion TLP at the head of the completion buffer may be forwarded to the application layer at 340 and de-queued from the completion buffer at 342.

If it is determined that completion buffer read pointer for the completion TLP is identical to the completion buffer write pointer at 332, the first requester identification captured in the first ordering token is compared to the completer identification captured in the completion TLP at 334. The virtual channel identification captured in the first ordering TLP is also compared to the virtual channel identification in the completion TLP at 334. If the completer identification is determined to be identical to the requester identification, and the virtual channel identification in the first ordering token is also determined to be identical to the virtual channel for the completion TLP, the completion TLP is determined to have arrived after the first posted TLP corresponding to the first ordering token having matching requester identification, virtual channel identification, and write pointer.

The PCIe packet ordering mechanism may order or reorder the completion TLP at 338 by, for example, holding the completion TLP in the completion queue to wait for the first posted TLP to be de-queued even if the completion TLP is at the head of the completion buffer. In some embodiments where it is determined to have a pointer match, an identification match (between a completer identification and a requester identification), and a virtual channel identification match, one or more posted TLPs that correspond to the matching requester identification and the virtual channel identification may be identified at 348. In these embodiments, more than one posted TLP may be identified to have a pointer match, an identification match, and virtual channel match with a completion TLP. The completion TLP may be held in the completion buffer at 350. The completion TLP may be de-queued after the one or more posted TLPs identified at 348 have been de-queued from their buffer(s).

If it is determined that a pointer match is found at 332, but either the requester identification does not match the completer identification or the first virtual channel identification in the first ordering token is different from the virtual channel identification for the completion TLP, 344 and 346 may be performed. More specifically, in some embodiments where there is a pointer match but a virtual channel mismatch or a requester/completer identification mismatch, the completion TLP may be de-queued from the completion queue and forwarded to the application layer at 344. The write pointer stored in the first ordering token may be updated with the read pointer of the next completion TLP at 346 to maintain the proper temporal sequence of completion TLPs.

Similar processes may also be performed for the second posted TLP with respect to the completion TLP at the head of the completion buffer. The completion buffer read pointer for the completion TLP may be compared to the write pointer captured in the second ordering token to determine whether the read pointer is identical to the write pointer at 344. If the read pointer is determined to be different from the write pointer, 340 and 342 may be performed in some embodiments. If the determination result is affirmative, the second requester identification and the second virtual channel identification for the second posted TLP are respectively compared to the completer identification and the virtual channel identification for the completion TLP at 346. If both comparison results are affirmative, the completion TLP needs to be reordered, and 338 may be performed. Otherwise, 344 and 346 may be performed when either there is a virtual channel mismatch or an identification mismatch.

System Architecture Overview

Figure 4:
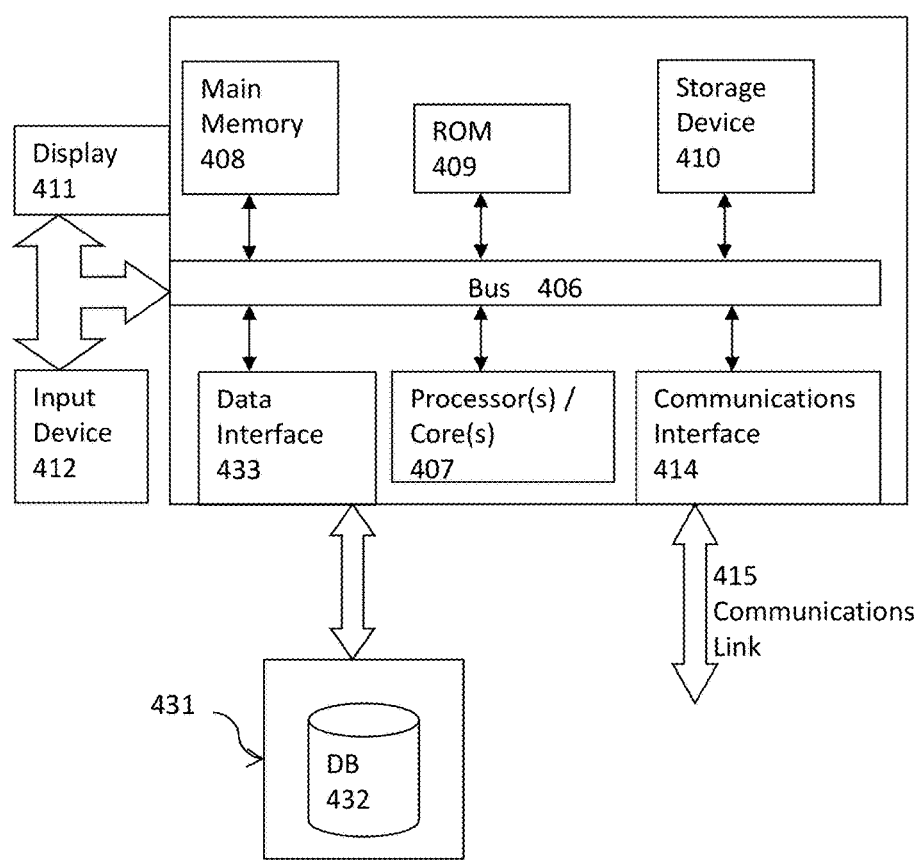
FIG. 4 illustrates a computerized system including a PCI implementation on which a method for implementing a PCI implementation handling multiple packets in a single cycle or multiple clock cycles may be implemented.

FIG. 4 illustrates a block diagram of an illustrative computing system 400 suitable for implementing a PCI implementation as described in the preceding paragraphs with reference to various figures. Computer system 400 includes a bus 406 or other communication mechanism for communicating information, which interconnects subsystems and devices, such as processor 407, system memory 408 (e.g., RAM), static storage device 409 (e.g., ROM), disk drive 410 (e.g., magnetic or optical), communication interface 414 (e.g., modem or Ethernet card), display 411 (e.g., CRT or LCD), input device 412 (e.g., keyboard), and cursor control (not shown).

According to one embodiment, computer system 400 performs specific operations by one or more processor or processor cores 407 executing one or more sequences of one or more instructions contained in system memory 408. Such instructions may be read into system memory 408 from another computer readable/usable storage medium, such as static storage device 409 or disk drive 410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 407, where the one or more processors, one or more processor cores, or combination thereof executes one or more threads. For example, the act of determining one or more estimated numbers of layers, the act of determining whether the power and/or ground layers accommodate power nets and/or thermal effects, the act of generating technology files, routing schemes, and/or via libraries, determining one or more fan-out sequences, the act of determining priorities of routing directions, the act of determining trace paths, the act of adjusting an estimated number of layers, etc. may be performed by one or more processors, one or more processor cores, or combination thereof. A mechanisms described herein may also be implemented as a pure hardware module (e.g., a block of electronic circuit components) or a combination of a hardware module and a software block that jointly perform various tasks to achieve various functions or purposes described herein or equivalents thereof. For example, a mechanism described herein may be implemented as an application-specific integrated circuit (ASIC) in some embodiments. A mechanism described herein or an equivalent thereof may perform its respective functions alone or in conjunction with one or more other mechanisms. A mechanism described herein or an equivalent thereof may thus invoke one or more other mechanisms by, for example, issuing one or more commands or function calls. The invocation of one or more other mechanisms may be fully automated or may involve one or more user inputs.

The term "computer readable storage medium" or "computer usable storage medium" as used herein refers to any medium that participates in providing instructions to processor 407 for execution. Such a medium may take many forms, including but not limited to, non-volatile media and volatile media. Non-volatile media includes, for example, optical or magnetic disks, such as disk drive 410. Volatile media includes dynamic memory, such as system memory 408. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 400. According to other embodiments of the invention, two or more computer systems 400 coupled by communication link 415 (e.g., LAN, PTSN, or wireless network) may perform the sequence of instructions required to practice the invention in coordination with one another.

Computer system 400 may transmit and receive messages, data, and instructions, including program, i.e., application code, through communication link 415 and communication interface 414. Received program code may be executed by processor 407 as it is received, and/or stored in disk drive 410, or other non-volatile storage for later execution. In an embodiment, the computer system 400 operates in conjunction with a data storage system 431, e.g., a data storage system 431 that includes a database 432 that is readily accessible by the computer system 400. The computer system 400 communicates with the data storage system 431 through a data interface 433. A data interface 433, which is coupled to the bus 406, transmits and receives electrical, electromagnetic or optical signals that include data streams representing various types of signal information, e.g., instructions, messages and data. In embodiments of the invention, the functions of the data interface 433 may be performed by the communication interface 414.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A method for handling packet transmission in a peripheral component interconnect (PCI) implementation, comprising:
   performing error filtering and flow control for at least a completion transaction layer packet (TLP) and a plurality of posted transaction layer packets (TLPs) at least with one or more receive buffers in a transaction layer of the PCI implementation;
   associating, at the PCI implementation, a first posted TLP in the plurality of posted TLPs with a first ordering token;
   determining, at a pointer-based or identification-based ordering mechanism including comparison logic circuit and at least the one or more receive buffers in the PCI implementation, an order for handling the first posted TLP and a completion TLP from the one or more receive buffers at least by repurposing at least one receive buffer of the one or more receive buffers for comparing a first pointer in the first ordering token with a second pointer for the completion TLP; and
   determining, with the pointer-based or identification-based ordering mechanism in the PCI implementation, the order for handling the first posted TLP and the completion TLP from the one or more receive buffers at least by further comparing one or more token attributes of the first ordering token with one or more attributes of the completion TLP, wherein the one or more token attributes of the first ordering token comprise a requester identification and a virtual channel identification of the first posted TLP.

2. The method of claim 1, wherein determining the order at the pointer-based or identification-based ordering mechanism is performed based in part or in whole upon a pointer match criterion.

3. The method of claim 2, wherein the first pointer comprises a write pointer of a completion buffer for the first posted TLP, and the second pointer comprises a read pointer of the completion buffer for the completion TLP.

4. The method of claim 3, wherein the pointer match criterion comprises whether the read pointer of the completion buffer for the completion TLP matches the write pointer of the completion buffer for the first posted TLP.

5. The method of claim 3, wherein the one or more receive buffers include the completion buffers that store the completion TLP, and the order for handling the first posted TLP and the completion TLP is determined with the pointer-based or identification-based ordering mechanism using existing attributes, without introducing additional attributes to the PCI implementation.

6. The method of claim 1, wherein the plurality of posted TLPs include at least two posted TLPs that arrive at a receive buffer of the one or more receive buffers in one clock cycle.

7. The method of claim 1, wherein determining the order for handling the first posted TLP and the completion TLP comprises:
   comparing, with the pointer-based or identification-based ordering mechanism in the PCI implementation, a write pointer for a receive buffer stored in the first ordering token with a read pointer for the receive buffer associated with the completion TLP.

8. The method of claim 7, wherein determining the order for handling the first posted TLP and the completion TLP comprises:
   de-queuing the completion TLP by forwarding the completion TLP to an application layer, wherein the write pointer stored in the first ordering token is determined to be different from the read pointer associated with the completion TLP.

9. The method of claim 7, wherein determining the order for handling the first posted TLP and the completion TLP comprises:
comparing a requester identification stored in the first ordering token for the first posted TLP to a completer identification associated with the completion TLP to generate an identification matching result; and
comparing the virtual channel identification stored in the first ordering token for the first posted TLP to a completion virtual channel identification associated with the completion TLP to generate a virtual channel matching result.

10. The method of claim 9, wherein determining the order for handling the first posted TLP and the completion TLP comprises:
de-queuing the completion TLP by forwarding the completion TLP to an application layer, wherein the write pointer stored in the first ordering token is determined to be identical to the read pointer associated with the completion TLP, and at least one of the virtual channel matching result and the identification matching result is determined to be negative; and
updating the write pointer stored in the first ordering token to a next read pointer of the receive buffer, wherein the write pointer stored in the first ordering token is determined to be matching the read pointer associated with the completion TLP.

11. The method of claim 9, wherein determining the order for handling the first posted TLP and the completion TLP comprises:
ordering the completion TLP with respect to at least the first posted TLP when both the identification matching result and the virtual channel matching result are determined to be affirmative; and
holding the completion TLP in the receive buffer, regardless of a relative order in which the completion TLP and the first posted TLP are received in the receive buffer.

12. The method of claim 11, wherein determining the order for handling the first posted TLP and the completion TLP comprises:
de-queuing the completion TLP in the receive buffer after de-queuing one or more posted TLPs including the first posted TLP and having one or more requester identifications matching the completer identification and one or more virtual channel identifications matching the completion virtual channel identification.

13. The method of claim 9, further comprising:
associating one or more additional posted TLP in the plurality of posted TLPs with one or more corresponding ordering tokens; and
determining, with the pointer-based or identification-based ordering mechanism in the PCI implementation, the order for handling the first posted TLP, the one or more additional posted TLPs, and the completion TLP from the one or more receive buffers by comparing one or more pointers in the one or more corresponding ordering tokens with the second pointer for the completion TLP.

14. The method of claim 13, further comprising:
revising, with the pointer-based or identification-based ordering mechanism in the PCI implementation, the order for handling the first posted TLP, the one or more posted TLPs, and the completion TLP from the one or more receive buffers by further comparing the one or more token attributes of the one or more corresponding ordering tokens with the one or more attributes of the completion TLP, wherein at least two posted TLPs arrive at a receive buffer storing therein the completion TLP in a same clock cycle; and
de-queuing the completion TLP, the first posted TLP, and the one or more additional posted TLPs according to the order that has been revised.

15. A peripheral component interconnect (PCI) implementation, comprising:
one or more receive buffers configured for error filtering and flow control for at least a completion transaction layer packet (TLP) and one or more posted transaction layer packets (TLPs) in the one or more receive buffers of the PCI implementation;
a set of write pointers and a set of read pointers configured for allocation to packets in the one or more receive buffers;
a token management mechanism configured to associate one or more attributes of a posted TLP with an ordering token, wherein the token management mechanism associates one or more ordering tokens with the one or more posted TLPs;
a pointer-based or identification-based ordering mechanism including comparison logic circuit and at least the one or more receive buffers and configured to generate a pointer matching result including an order for handling a completion TLP and the one or more posted TLPs at least by repurposing at least one receive buffer of the one or more receive buffers for comparing a read pointer for the completion TLP to one or more write pointers stored in the one or more ordering tokens; and
the pointer-based or identification-based ordering mechanism in the PCI implementation further configured to determine the order for handling the first posted TLP and the completion TLP from the one or more receive buffers at least by further comparing one or more token attributes of the ordering token with one or more attributes of the completion TLP, wherein the one or more token attributes of the ordering token comprise a requester identification and a virtual channel identification of the first posted TLP.

16. The peripheral component interconnect implementation of claim 15, further comprising:
the pointer-based or identification-based ordering mechanism in the PCI implementation to revise the order for handling the one or more posted TLPs and the completion TLP by further comparing the one or more token attributes of the ordering token with one or more attributes of the completion TLP, wherein
the pointer-based or identification-based ordering mechanism is invoked when the read pointer for the completion TLP is determined to match at least one write pointer stored in at least one ordering token for at least one posted TLP of the one or more posted TLPs.

17. The peripheral component interconnect implementation of claim 16, the pointer-based or identification-based ordering mechanism comprising:
a first identification comparator configured to compare a requester identification stored in the at least one ordering token for the at least one posted TLP to a completer identification associated with the completion TLP and generate an identification matching result; and
a second identification comparator to compare the virtual channel identification stored in the ordering token for the at least one posted TLP to a completion virtual channel identification associated with the completion TLP and generate a virtual channel matching result.

18. The peripheral component interconnect implementation of claim 17, the pointer-based or identification-based ordering mechanism comprising:
a processing order determination mechanism to determine the order in which the completion TLP and the one or more posted TLPs are processed based in part upon the pointer matching result, the identification matching result, and the virtual channel matching result.

* * * * *